Patented Jan. 28, 1930

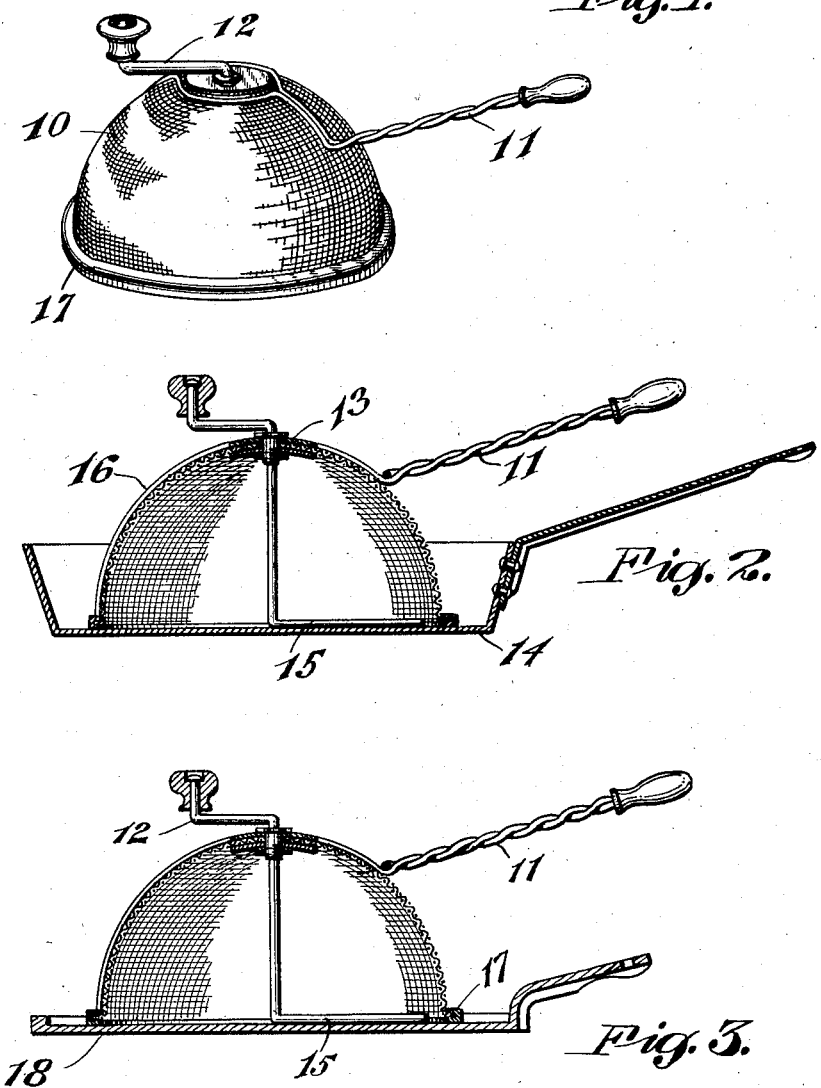

1,744,900

UNITED STATES PATENT OFFICE

MORRIS JOFFE, OF NEW YORK, N. Y.

CORN-POPPING APPARATUS

Application filed August 3, 1928. Serial No. 297,247.

This invention relates to improvements in corn poppers and more particularly to apparatus which may be employed with any ordinary cooking utensil or receptacle, so that the same may also serve as an efficient corn popper.

The object of this invention is to provide an inexpensive corn popper attachment which may be used in conjunction with any size or type of home cooking utensil such as a pot, frying pan, griddle iron or similar utensil, so that the corn may be properly ventilated and agitated during the popping process.

Another object of the invention is to provide apparatus of the character designated in which a dome shaped container of foraminous material shall be placed directly in contact with the bottom of the utensil so as to obviate the necessity of any fastening mechanism for holding the device in position on the utensil to which it may be applied.

A further object of the invention is to provide an apparatus of the character designated which shall be durable in construction, and simple in operation, so that it may readily be applied to any ordinary cooking utensil without alteration or adjustment thereof to pop corn more efficiently than similar devices heretofore employed.

These and other objects will be more manifest from the following description taken in connection with the accompanying drawings and specifically set forth in the appended claims.

In the drawings:

Figure 1 is a perspective view of the device embodying my invention.

Figure 2 is a sectional view showing the application of the invention to a frying pan.

Figure 3 is a similar view showing the application to a griddle iron.

Corn popping attachments heretofore employed with cooking utensils have been constructed for use with a particular kind or type of cooking utensil. One important feature of the present invention is that the corn popper attachment hereinafter described may be applied with equal facility to a deep receptacle or shallow plate of any size whenever it may be desired to use the same as a corn popper.

Referring to Figure 1 of the drawing there is shown a corn popping attachment in the form of a dome shaped container 10 made of foraminous material such as light woven wire for example. The bottom of the container is open so that the corn to be popped rests directly on the cooking utensil used in conjunction with the device. The container is provided with a handle 11 secured near the top portion thereof, and this enables the device to be held in contact with any cooking utensil to which it may be applied. The contents of the container may be agitated by an agitator handle member 12 mounted in a bearing 13 located at the top of the container.

In Figure 2 the apparatus 10 is positioned in a large size frying pan 14 and an agitator 15 operated by handle 12 is adapted to be moved over the heated surface of the pan to properly agitate the corn during the popping process. The foraminous container 10 is reinforced by wires 16 which form an extension of the handle member 11 and these partially encircle the dome shaped container. The wire 16 is soldered to the wire meshes and also to the bearing plates 13 so that a rigid structure is obtained. The edge of the container is also reinforced by a heavy rim 17 also soldered to the ends of wires 16, and thus the device is able to withstand considerable rough usage to which it may be subjected.

In Figure 3 the device is placed on a flat griddle iron 18, thereby illustrating the wide variety of cooking utensils to which the improved corn popping attachment may be applied.

Another important feature of the invention is that the lower edge of the container 10 engages only on the bottom of the cooking utensil to which it is applied and is not restricted in use to any particular type, size or kind of receptacle.

The container 10 being of foraminous material the corn may be properly ventilated and observed during the popping process. This construction provides an attachment which may be manipulated independently of the receptacle to which it is applied.

While I have shown the device applied to two different kinds of cooking utensils, it is obvious that various changes may be made therein without departing from the scope of the invention as set forth in the claims.

What I claim is:

1. In combination with a cooking utensil having a substantially flat bottom, a dome shaped foraminous container having an open side adjacent to the bottom of said utensil, a handle means associated with the container and partially encircling the container for reinforcing the same and an agitator arranged to move in the plane of the open side and agitate the contents on the heated surface of the cooking utensil.

2. In a corn popping apparatus the combination with a dome shaped foraminous receptacle having an open side adapted to lie adjacent to a heated surface, of a rotatable agitator carried by the top portion of the receptacle and having agitator members adapted to move in the plane of the open side thereof, reinforcing members for the foraminous receptacle and an angularly disposed handle member supported by the reinforcing members.

In testimony whereof I affix my signature.

MORRIS JOFFE.